(12) United States Patent
Stiles

(10) Patent No.: US 6,863,520 B1
(45) Date of Patent: Mar. 8, 2005

(54) AUGER SCOOP

(76) Inventor: Craig A. Stiles, 213 S. 2nd St. E., Malta, MT (US) 59538

( * ) Notice: Subject to any disclaimer, the term of this patent is extended or adjusted under 35 U.S.C. 154(b) by 62 days.

(21) Appl. No.: 10/610,897

(22) Filed: Jul. 1, 2003

(51) Int. Cl.[7] ............................................... A23G 9/28
(52) U.S. Cl. ...................... 425/280; 425/281; 425/298; 425/317
(58) Field of Search ..................... 425/221, 276–286, 425/298, 317; 426/512; 30/276, 277.4; 408/199; 409/65; 175/18

(56) References Cited

U.S. PATENT DOCUMENTS

| | | | | |
|---|---|---|---|---|
| 2,201,403 A | * | 5/1940 | Knaust | ........................ 425/150 |
| 2,547,651 A | * | 4/1951 | McCrum | ..................... 425/280 |
| 2,631,551 A | * | 3/1953 | Lawrence et al. | .......... 425/187 |
| 4,850,843 A | * | 7/1989 | Ralls | .......................... 425/279 |

* cited by examiner

Primary Examiner—James P. Mackey
Assistant Examiner—Donald Heckenberg

(57) ABSTRACT

The auger scoop is a handheld, cordless appliance for scooping frozen substances that has three components: an auger unit, a power unit, and a wall-mountable charger unit. The auger unit consists of a cylindrical tube having a flat, angled blade slightly recessed within the lower end and an angled butt plate at the upper end. The auger unit features a shaft extending from the upper end which is inserted into the power unit. The power unit consists of a rechargeable battery pack, a housing, and a motor and drive assembly that are activated by a switch on the external housing. When activated, the power unit rotates the tube, thereby rotating the blade and allowing the auger unit to bore into the frozen substance. The charger unit features a plug with which it is connected to a wall socket, an AC to DC converter, and a receptacle for the power unit.

20 Claims, 2 Drawing Sheets

AUGER SCOOP

BACKGROUND OF THE INVENTION

1. Field of the Invention

The present invention relates to a food service implement for use in connection with scooping and serving ice cream in decorative swirls. The auger scoop has particular utility in connection with providing an electrically powered scoop for easily scooping and decoratively serving frozen ice cream.

2. Description of the Prior Art

Ice cream is a very popular food item and is served in numerous households, restaurants, soda shoppes, and other establishments. Dispensing instruments for ice cream include spoons, scoops with hemispherical bowls, scoops with internal warming fluids, and dispensers with sliding wipers. All of these implements are used in an attempt to serve ice cream into individual sized portions in a pleasing presentation.

One of the most prevalent problems with serving ice cream is that it is often very hard when it has been in the freezer for any length of time, making it difficult to insert the scooping device into the container. It is common for the handle of the scooping implement to bend, and sometimes break, when a user attempts to scoop solidly frozen ice cream. In addition, individuals with limited hand, wrist, and/or arm strength find it difficult to scoop ice cream in this manner. Other problems include ice cream sticking in the scoop due to its hemispherical shape. Many types of wiping blades have been invented to alleviate this problem, but these are largely ineffective since the ice cream tends to freeze to the internal side of the scoop. Plungers have also been implemented to help eject the scooped ice cream, but the cups used in these implementations have difficulties with presenting aesthetically pleasing servings and with holding softer ice cream. Therefore, a device which could be used for easily scooping and decoratively serving frozen ice cream would be highly desirable by individuals eating at home, restaurant owners, or other individuals involved in food preparation.

The use of ice cream scoops is known in the prior art. For example, U.S. Pat. No. 3,822,976 to Edward R. Moonan discloses an ice cream scoop having a trowel-like cylindrical scoop with a plunger that slides through the scoop to eject the ice cream therefrom and a handle extending perpendicularly downward from the scoop for gripping the device while scooping and ejecting the ice cream. However, the placement of the handle of the Moonan '976 device with respect to the scoop would make it difficult to scoop ice cream while grasping the handle. Further, the shaft of the scoop cannot be grasped during the scooping process since the rod that supports the plunger is not covered. Additionally, the Moonan '976 device requires the user to possess sufficient hand, arm and wrist strength to both scoop hard, frozen ice cream and eject it from the scoop. This could be difficult for the young or elderly, as well as those suffering from arthritis or other physical limitations.

U.S. Pat. No. 4,850,843 to W. Fred Ralls discloses an ice cream server that consists of a hemispherical bowl with a serrated cutting edge, a handle, and a motor for rotating the bowl relative to the handle in order to facilitate the scooping of the ice cream with the bowl. The bowl might also include a rotatable wiper blade for help in releasing scooped ice cream from the bowl. However, if the ice cream to be dispensed by the Ralls '843 server were somewhat melted, the portion of the substance in the bowl would tend to fall out as the server was drawn upward from the ice cream container. Additionally, the cutting edge of the bowl could pose a safety hazard upon which the user or other individuals might cut themselves. Lastly, the wiper blade of the Ralls '843 device is not an overly effective means for releasing ice cream from the bowl and could require intervention from the user to accomplish the release.

Similarly, U.S. Pat. No. 2,970,555 to Mayo J. Baker and Tom F. Mason discloses a dispensing scoop that consists of a cylindrical cup mounted on a shaft featuring a radially mounted plunger disk that is operated by a squeeze trigger located on a handle. The handle extends perpendicularly downward from the cylindrical cup and plunger shaft. However, the Baker, et al. '555 patent fails to provide a cutting edge on the cup; therefore the user would need to exert sufficient hand, wrist, and arm strength to pass the scoop through hard, frozen ice cream. This could be a difficult proposition for young children, the elderly, or for any individual with limited strength or physical ailments in the hands or arms. In addition, the position of the cup with respect to the handle would make it difficult to scoop ice cream from conventional containers. Moreover, the cup of the Baker, et al. '555 device would not be capable of retaining slightly melted ice cream while it is drawn from a container.

U.S. Pat. No. 1,978,943 to Ora E. Harris discloses an ice cream dipper having an inverted cylindrical cup with a cutting edge on the bottom and an ejector consisting of a cupped plunger mounted on a shaft and operated by depressing a plunger knob. However, the ice cream which is not completely frozen would tend to fall out of the Harris '943 device when it is lifted from the container. Furthermore, the shape of the cylindrical cup does not lend itself to conventional serving portions of ice cream. Lastly, the cutting edge of the Harris '943 device could present a safety hazard for the user or a child who accidentally picks up the dipper.

Likewise, U.S. Pat. No. Des. 305,852 to Richard N. Clement and Theresa M. Karczmarczyk discloses the ornamental design for a battery heated ice cream scoop having an arcuate spoon portion attached to a handle. However, the Clement, et al. '852 patent fails to provide a mechanism for helping remove the ice cream from the spoon portion of the scoop. Additionally, heating the scoop would tend to make the ice cream melt, which might not be acceptable to those consuming the ice cream. Finally, the user of the Clement, et al. '852 scoop would need to possess sufficient hand, wrist, and arm strength to pass the scoop through hard, frozen ice cream, which could be difficult for those with limited strength or physical ailments in the hands or arms.

U.S. Pat. No. 5,007,591 to Thomas E. Daniels, Jr. discloses an ice shaver apparatus that includes a cylindrical ice receiving chamber with a lid and an opening in the bottom and housing an elongated blade with its knife edge projecting through the opening into the chamber. However, the Daniels, Jr. '591 patent fails to provide a mechanism by which ice cream, or a similar material, could be scooped from a container; therefore, it would not be feasible for use in this capacity.

Similarly, U.S. Pat. No. 4,758,150 to Bruno Fanini, Adelio Ciresola, and Alberto Aldegheri discloses a scoop for dispensing balls of ice cream that comprises a hemispherical spoon equipped with handle and an electrically actuated sweeping band mounted for rotation on the spoon to release ice cream from the spoon. However, the Fanini, et al. '150 device would require the user to have sufficient hand and arm strength to scoop frozen ice cream from its container.

This could be difficult for the elderly, those suffering from arthritis or other physical limitations, and young children. Furthermore, the hemispherical spoon tends to retain the ice cream and does not permit its easy release. Lastly, the sweeping band, which is intended to remove the ice cream by sweeping the inner surface of the spoon, is ineffective in releasing the ice cream easily.

U.S. Pat. No. 3,787,163 to Neil E. Denison and Edward E. McCullough discloses a powered ice cream dipper that provides a dipper apparatus which attaches to a conventional electric knife handle. The dipper is slightly less than hemispherical with sharpened and serrated edges and may be electrically heated to facilitate removal of ice cream therefrom. However, the Denison, et al. '163 device could only be used by consumers owning a specific type of electrical knife. Additionally, heating the dipper would cause the ice cream to begin melting, which might not be agreeable to those eating the ice cream. Finally, the sharp, serrated edges of the dipper could pose a danger to the user or a small child who might pick up the scoop.

Likewise, U.S. Pat. No. Des. 369,944 to Mark Cartellone discloses the ornamental design for an attachment for a hand-held blender that consists of a cylindrical container with a shaft positioned along the longitudinal axis and to which two rotating blades are radially mounted. However, the Cartellone '944 patent fails to provide a mechanism by which ice cream, or a similar material, could be scooped from a container; therefore, it would not be feasible for use in this capacity.

U.S. Pat. No. 4,819,744 to Ty J. Caswell discloses a funnel hole ice auger that includes a pair of ice boring blades fixedly attached to the bottom of a straight inner auger drive bar having a spiral auger blade wound around it and which extends upward and connects to a handle assembly including a crank arm. However, the Caswell '744 patent fails to provide an enclosed tube around the blades and into which ice cream, or another substance, could be contained after being cut. In addition, the Caswell '744 device is not electrically powered and would require a significant amount of arm and hand strength to operate. Finally, the Caswell '744 device would present a danger to users since neither the boring nor the spiral blades are shielded in any manner.

Similarly, U.S. Pat. No. Des. 329,784 to Joseph F. Wong discloses the ornamental design for an ice cream scoop having a hemispherical scoop on one end and a gripping surface on the handle. However, users having limited wrist and arm strength, such as the elderly, persons suffering from arthritis, or young children, would find it difficult to scoop hard ice cream with the Wong '784 device since it fails to provide electrical aid or an ice cream softening agent. Furthermore, the bowl of the Wong '784 device would tend to retain the ice cream and would cause difficulty when the user attempted to release the ice cream.

U.S. Pat. No. 2,631,551 to Bert F. Lawrence and Emma Ethel Lawrence discloses an electric ice cream scoop having a rotatable bowl with a revolving cutter and a movable bail contained within the bowl. However, the hemispherical bowl of the Lawrence, et al. '551 patent tends to retain the ice cream and does not permit its easy release. In addition, the movable bail, which is intended to remove the ice cream by sweeping the inner surface of the scoop, is ineffective in releasing the ice cream easily. Finally, the scoop would be difficult to clean, especially due to the placement of the cutter and moveable bail.

Lastly, U.S. Pat. No. 2,591,516 to V. L. Darnell discloses an electric dispensing device for semi-fluid substances with a cup member that has a cutting edge and a plunger for releasing substances from the cup member. However, the cup member of the Darnell '516 patent would be difficult to clean, especially under the plunger and around the teeth of the cutting edge. In addition, if the ice cream, or other substance to be dispensed, were somewhat melted, the portion of the substance in the cup would tend to fall out as the dispensing device was drawn upward from the container which houses the substance.

While the above-described devices fulfill their respective, particular objectives and requirements, the aforementioned patents do not describe an auger scoop that allows the user to easily scoop decorative servings of frozen ice cream. None of the aforementioned patents provide a device which can serve ice cream in a decorative manner. Moreover, the Daniels, Jr. '591 and the Cartellone '944 patents fail to provide a mechanism by which ice cream, or a similar material, could be scooped from a container; therefore, they would not be feasible for use in this capacity. Furthermore, the Caswell '744 patent fails to provide an enclosed tube around the blades and into which ice cream, or another substance, could be contained after being cut. In addition, the Moonan '976, Baker, et al. '555, Clement, et al. '852, Fanini, et al. '150, Caswell '744, Wong '784, and Darnell '516 devices require the user to possess sufficient hand, arm and wrist strength to both scoop hard, frozen ice cream and eject it from the scoop. This could be difficult for the young or elderly, as well as those suffering from arthritis or other physical limitations. Furthermore, the cutting edge of the Ralls '843, Harris '943, Denison, et al. '163, and Caswell '744 devices could pose a safety hazard wherein the user or other individuals might cut themselves. Ice cream which is not completely frozen would tend to fall out of the Ralls '843, Baker, et al. '555, Harris '943, and Darnell '516 devices when the ice cream is lifted from the container. In addition, the position of the cup with respect to the handle of the Moonan '976, Baker, et al. '555, and Harris '943 devices would make it difficult to scoop ice cream from conventional containers, and the shape of the cylindrical cup of the Harris '943 device does not lend itself to conventional serving portions of ice cream. Additionally, the hemispherical spoon of the Fanini, et al. '150, Wong '784, and Lawrence, et al. '551 devices tend to retain the ice cream and do not permit its easy release. Moreover, the sweeping band of the Fanini, et al. '150, Lawrence, et al. '551 and Ralls '843 devices, which is intended to remove the ice cream by sweeping the inner surface of the spoon, is ineffective in releasing the ice cream easily. Furthermore, the Clement, et al. '852 patent fails to provide a mechanism for helping remove the ice cream from the spoon portion of the scoop. In addition, the Clement, et al. '852 and Denison, et al. '163 patents make provisions for heating the devices; however, this could make the ice cream melt, which might not be acceptable to all consumers. Finally, the Lawrence, et al. '551 and Darnell '516 devices would be difficult to clean, and the Denison, et al. '163 device could only be used by consumers owning a specific type of electrical knife.

Therefore, a need exists for a new and improved auger scoop that can be used for easily producing servings of ice cream in the form of continuous spirals or corkscrews. In this regard, the present invention substantially fulfills this need. In this respect, the auger scoop according to the present invention substantially departs from the conventional concepts and designs of the prior art, and in doing so provides an apparatus primarily developed for the purpose of providing an electrically powered scoop for easily scooping and decoratively serving frozen ice cream.

SUMMARY OF THE INVENTION

In view of the foregoing disadvantages inherent in the known types of ice cream scoops now present in the prior art, the present invention provides an improved auger scoop, and overcomes the above-mentioned disadvantages and drawbacks of the prior art. As such, the general purpose of the present invention, which will be described subsequently in greater detail, is to provide a new and improved auger scoop which has all the advantages of the prior art mentioned heretofore and many novel features that result in an auger scoop which is not anticipated, rendered obvious, suggested, or even implied by the prior art, either alone or in any combination thereof.

To attain this, the present invention essentially comprises an augur unit, consisting of a cylindrical tube with a slanted, semi-circular blade at one end and a butt plate at the other end, connected to a motorized power unit via a drive shaft. The power unit is capable of being recharged in a charger unit that plugs into a wall socket.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved auger scoop that has all of the advantages of the prior art ice cream scoops and none of the disadvantages.

It is another object of the present invention to provide a new and improved auger scoop that may be easily and efficiently manufactured and marketed.

An even further object of the present invention is to provide a new and improved auger scoop that has a low cost of manufacture with regard to both materials and labor, and which accordingly is then susceptible of low prices of sale to the consuming public, thereby making such an auger scoop economically available to the buying public.

Still another object of the present invention is to provide a new auger scoop that provides in the apparatuses and methods of the prior art some of the advantages thereof, while simultaneously overcoming some of the disadvantages normally associated therewith.

Even still another object of the present invention is to provide an auger scoop that is electrically operated. This allows the user to easily remove servings of hard frozen ice cream, even if he has limited physical strength in his hands, wrists, and arms.

Yet another object of the present invention is to provide an auger scoop that produces spiral ribbons of ice cream. This allows the user to serve decorative portions of ice cream and could be used to produce aesthetically pleasing dessert items.

Still yet another object of the present invention is to provide an electrically operated and rechargeable auger scoop for easily removing servings of hard frozen ice cream. This guarantees that the scoop has a fresh power source at all times and eliminates the need for the user to stock batteries with which to replace dead batteries.

Even yet another object of the present invention is to provide an auger scoop that is easy to clean. This allows the user to either machine or hand-wash the scoop with a minimal amount of time and effort expended.

Lastly, it is an object of the present invention to provide a new and improved auger scoop that allows the user to serve ice cream without his hands coming into contact with the ice cream during any part of the process. This allows the user to serve ice cream in a more sanitary fashion and diminishes the chances that dirt, oil, or germs from his hands will end up in the ice cream.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description males reference to the annexed drawings wherein.

The same reference numerals refer to the same parts throughout the various figures.

DESCRIPTION OF THE PREFERRED EMBODIMENT

Figure 1:
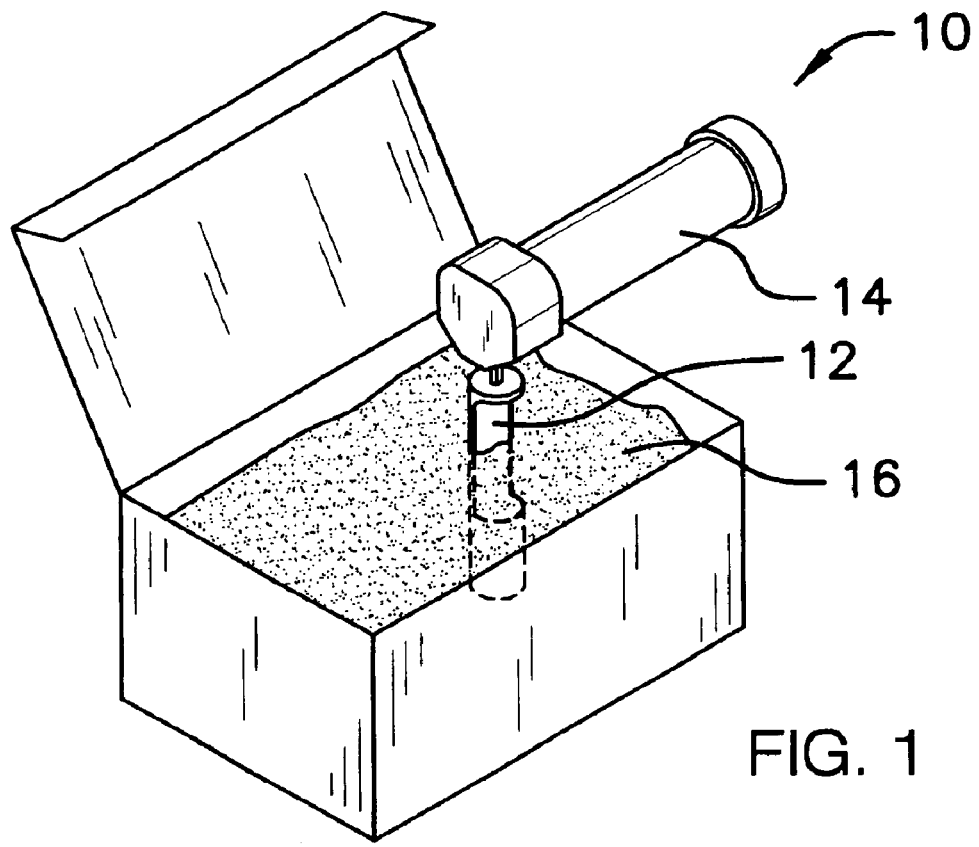
FIG. 1 is a right side perspective view of the preferred embodiment of the auger scoop constructed in accordance with the principles of the present invention.

Referring now to the drawings, and particularly to FIGS. 1–5, a preferred embodiment of the auger scoop of the present invention is shown and generally designated by the reference numeral 10.

In FIG. 1, a new and improved auger scoop 10 of the present invention for easily scooping and decoratively serving frozen ice cream is illustrated and will be described. More particularly, the auger scoop 10 has an auger unit 12 mounted on a rechargeable power unit 14. The auger unit 12 is approximately 7–8 inches long x 1¾ inches in diameter and extends perpendicularly downward from the power unit 14. The cylindrical power unit 14 would contain a 100–150 RPM motor that would rotate the auger unit 12 to bore into the hard ice cream 16 and form continuous spirals or corkscrews of the dessert.

Figure 2:
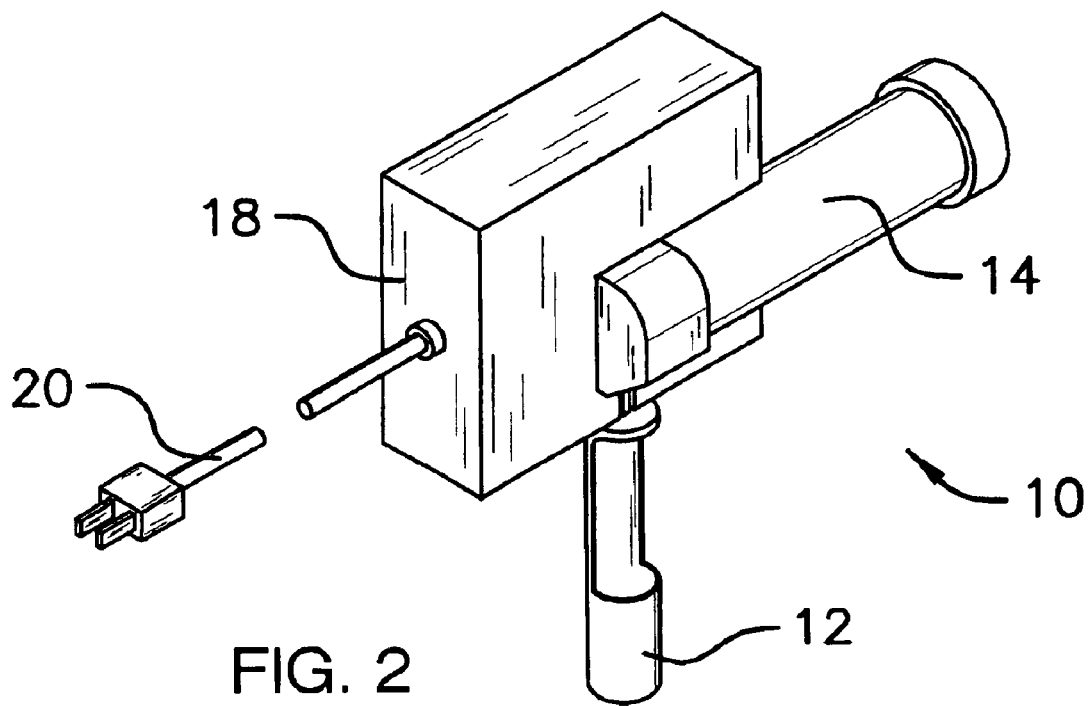
FIG. 2 is a right side perspective view of the auger scoop of the present invention mounted in the wall mounted charging unit.

FIG. 2 is a right side perspective of the auger scoop 10 with the power unit 14 inserted into a wall mounted charger unit 18. The charger unit 18 contains an AC to DC transformer and has a power cord 20 that could be plugged into a nearby outlet. The power unit 14 is formed similar to a flashlight handle and would snap into an opening in the charger unit 18. The power unit 14 could also feature a textured surface to aid the user in maintaining his grip and a push button activation switch on its underside.

Figure 3:
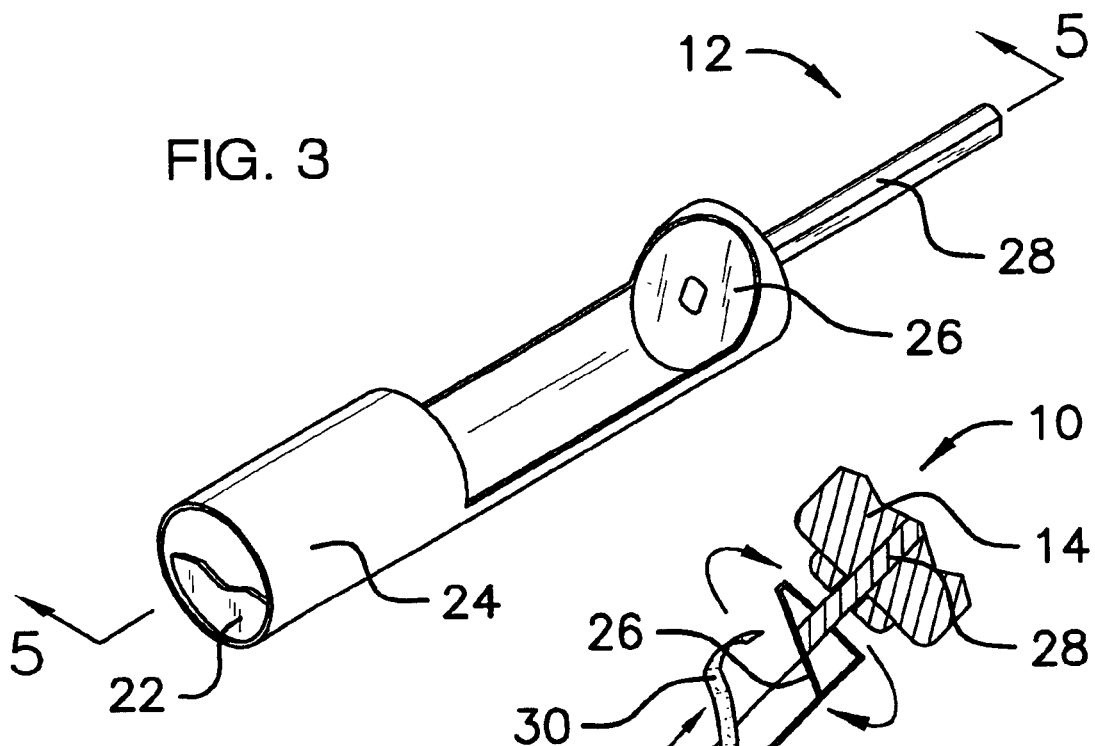
FIG. 3 is a right side perspective view of the auger unit of the auger scoop of the present invention.
Figure 4:
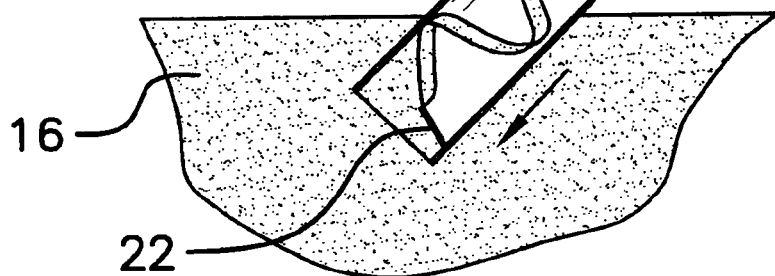
FIG. 4 is a right cross sectional view taken along the longitudinal axis of the auger scoop of the present invention.
Figure 5:
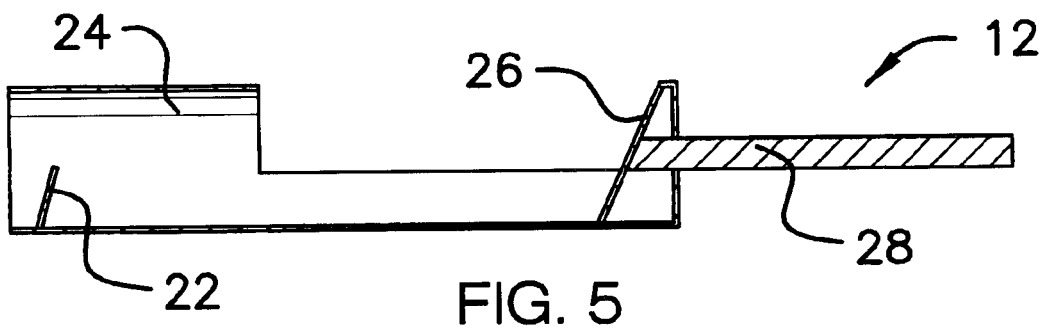
FIG. 5 is a right side cross sectional view of the auger unit of the auger scoop of the present invention.

FIGS. 3–5 show views of the auger unit 12. The auger unit 12 consists of a flat, stainless steel auger blade 22 mounted in the bottom end of a 7–8 inch long by 1¾ inch diameter tubular frame 24. The tubular frame 24 is bisected to allow ice cream swirls 30 to be removed as they are formed. The auger blade 22 would have the shape of a semi-circle with a dip towards the center of the flat side and would be recessed approximately 3⁄16 inch inside the tubular frame 24. The auger blade 22 would also be slanted to help cut into the ice cream 16 as the tubular frame 24 is rotated. A circular butt plate 26 with a ⅜ inch by 4 inch long steel shaft 28 is attached to the top end of the tubular frame 24. The power unit 14 would accept the shaft 28 so the tubular frame 24 can be rotated to cut the ice cream 16. Both the auger blade 22 and the butt plate 26 are angled back towards the top of the tubular frame 24.

In use, it can now be understood that the user would grip the textured surface of the power unit 14 and press the tip of the auger unit 12 into the surface of the ice cream 16. The user would then activate the motor, which would be geared to approximately 100 RPM, by depressing a push button switch on the underside of the power unit 14. The auger blade 22 would rotate and scoop out ribbons of ice cream as the tubular frame would bore down easily into the solid block of ice cream 16. When the user stopped the power unit 14, he could then withdraw the auger unit 12, lifting the twisted and curled ribbons 30 of ice cream out of the opening in the tubular frame 24. After cleaning the auger scoop 10 by hand or in the dishwasher, the power unit 14 could be recharged in the wall mounted charger unit 18.

While a preferred embodiment of the auger scoop has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the tubular frame described.

And although easily scooping and decoratively serving frozen ice cream have been described, it should be appreciated that the auger scoop herein described is also suitable for scooping or shaving other substances that have been frozen, such as juices, sauces, soups, and ice. Also, although the present embodiment envisions a cordless unit, employing an electrical cord to provide AC power does not deviate from the spirit and scope of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auger scoop comprising:
    a hollow cylindrical tube having an open bottom, a side wall having an interior surface, an exterior surface, an upper portion formed with a substantial opening, and a lower portion, and a circular top formed with an aperture at its center;
    a blade connected to said interior surface of said lower portion of said tube near said bottom of said tube;
    a circular butt plate having a circular top surface, an outer edge, and a circular bottom surface and formed with an aperture passing through the centers of said top and bottom surfaces and connected on said outer edge to said interior surface of said upper portion of said tube near said top of said tube;
    a shaft having a first end and a second end and connected on said first end to said cylindrical tube and said butt plate wherein said shaft passes through said aperture in said top of said tube and is inserted into said aperture in said butt plate;
    a power unit having an interior, an exterior surface, a first end formed with a longitudinal aperture, and a second end and connected to said shaft wherein said second end of said shaft is removably inserted into said longitudinal aperture; and
    an activation switch connected to said exterior surface of said power unit.

2. The auger scoop of claim 1 wherein said blade is semi-circular with an upper edge, a semi-circular lower edge, a top surface, and a bottom surface.

3. The auger scoop of claim 2 wherein said upper edge of said blade is cut in a wave pattern.

4. The auger scoop of claim 2 wherein said blade is angled with said upper edge angled toward said top of said tube and said lower edge angled toward said bottom of said tube.

5. The auger scoop of claim 4 wherein said butt plate is slanted at approximately the same angle as said blade.

6. The auger scoop of claim 1 wherein said power unit further comprises:
    a motor;
    a drive assembly connected to said motor and to said second end of said shaft; and
    a rechargeable battery pack connected to said motor.

7. The auger scoop of claim 6 wherein said motor actuates said drive assembly which rotates said shaft, thereby causing said tube and said blade attached to said tube to rotate.

8. The auger scoop of claim 1 further comprising:
    a battery charger unit formed with a receptacle to fit said power unit and removably connected to said power unit wherein said power unit is inserted into said receptacle in said charger unit.

9. The auger scoop of claim 8 wherein said battery charger unit further comprises:
   a housing with an interior and an exterior surface;
   an AC to DC converter connected to said interior of said housing; and
   a power cord connected to said housing.

10. An auger scoop comprising:
   a hollow cylindrical tube having an open bottom, a side wall having an interior surface, an exterior surface, an upper portion formed with a substantial opening, and a lower portion, and a circular top formed with an aperture at its center;
   a blade connected to said interior surface of said lower portion of said tube near said bottom of said tube;
   a circular butt plate having a circular top surface, an outer edge, and a circular bottom surface and formed with an aperture passing through the centers of said top and bottom surfaces and connected on said outer edge to said interior surface of said upper portion of said tube near said top of said tube;
   a shaft having a first end and a second end and connected on said first end to said cylindrical tube and said butt plate wherein said shaft passes through said aperture in said top of said tube and is inserted into said aperture in said butt plate;
   a power unit having an interior, an exterior surface, a first end formed with a longitudinal aperture, and a second end and connected to said shaft wherein said second end of said shaft is removably inserted into said longitudinal aperture;
   an activation switch connected to said exterior surface of said power unit; and
   a battery charger unit formed with a receptacle to fit said power unit and removably connected to said power unit wherein said power unit is inserted into said receptacle in said charger unit.

11. The auger scoop of claim 10 wherein said opening in said tube bisects said upper portion of said tube along said longitudinal axis.

12. The auger scoop of claim 10 wherein said power unit is cylindrical.

13. The auger scoop of claim 10 wherein said activation switch is a push button switch.

14. The auger scoop of claim 10 wherein said power unit further comprises:
   a motor;
   a drive assembly connected to said motor and to said second end of said shaft; and
   a rechargeable battery pack connected to said motor.

15. The auger scoop of claim 14 wherein said motor actuates said drive assembly which rotates said shaft, thereby causing said tube and said blade attached to said tube to rotate.

16. The auger scoop of claim 10 wherein said battery charger unit further comprises:
   a housing with an interior and an exterior surface;
   an AC to DC converter connected to said interior of said housing; and
   a power cord connected to said housing.

17. The auger scoop of claim 10 wherein said blade is semi-circular with an upper edge, a semicircular lower edge, a top surface, and a bottom surface.

18. The auger scoop of claim 17 wherein said upper edge of said blade is cut in a wave pattern.

19. The auger scoop of claim 17 wherein said blade is angled with said upper edge angled toward said top of said tube and said lower edge angled toward said bottom of said tube.

20. The auger scoop of claim 19 wherein said butt plate is slanted at approximately the same angle as said blade.

* * * * *